(12) United States Patent
Salowitz et al.

(10) Patent No.: US 10,386,197 B2
(45) Date of Patent: Aug. 20, 2019

(54) CALCULATING AN OPTIMAL ROUTE BASED ON SPECIFIED INTERMEDIATE STOPS

(71) Applicant: Microsoft Technology Licensing, LLC, Redmond, WA (US)

(72) Inventors: Elizabeth Picchietti Salowitz, Seattle, WA (US); Myron Clifford Thomas, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/157,169

(22) Filed: May 17, 2016

(65) Prior Publication Data
US 2017/0336221 A1 Nov. 23, 2017

(51) Int. Cl.
*G01C 21/36* (2006.01)
*G01C 21/34* (2006.01)
(Continued)

(52) U.S. Cl.
CPC ....... *G01C 21/3605* (2013.01); *G01C 21/343* (2013.01); *G01C 21/3476* (2013.01);
(Continued)

(58) Field of Classification Search
None
See application file for complete search history.

(56) References Cited

U.S. PATENT DOCUMENTS 5,559,707 A  9/1996  Delorme et al.
6,401,034 B1 *  6/2002  Kaplan .............. G01C 21/3476
340/988
(Continued)

FOREIGN PATENT DOCUMENTS

CN  104658297 A  5/2015
CN  104794198 A  7/2015
(Continued)

OTHER PUBLICATIONS

Perez, Sarah, "Google Maps Now Lets You Add a Stop Along Your Route, Check Gas Prices", Published on: Oct. 20, 2015 Available at: http://techcrunch.com/2015/10/20/google-maps-now-lets-you-add-a-stop-along-your-route-check-gas-prices/#.f57q8ij:hEA0.
(Continued)

*Primary Examiner* — Redhwan K Mawari
*Assistant Examiner* — Edward Torchinsky
(74) *Attorney, Agent, or Firm* — Davin Chin; Chin IP, PLLC

(57) ABSTRACT

Calculating an optimal route based on specified intermediate stops is described herein. A mapping application is configured to compute a route from a start point to an end point in dependence upon criteria specifying one or more intermediate stops. The initial route determination incorporates consideration of the one or more specified intermediate stops as part of calculating the route. In one example, a request is received to search for an intermediate stop that satisfies search criteria indicating at least a type of location. In response to the search, search results are obtained with multiple options for routes between the start point and end point including intermediate stops that satisfy the search criteria. An optimal route is selected from the multiple options based upon defined optimization criteria. Optimization criteria may include but is not limited to distance, travel time, traffic data, weather conditions, date and time, and so forth.

20 Claims, 10 Drawing Sheets

(51) Int. Cl.
  *G06Q 10/04* (2012.01)
  *G06Q 30/02* (2012.01)
  *G06Q 50/10* (2012.01)

(52) U.S. Cl.
  CPC ..... *G01C 21/3667* (2013.01); *G01C 21/3682* (2013.01); *G06Q 10/047* (2013.01); *G06Q 30/0282* (2013.01); *G06Q 50/10* (2013.01)

(56) References Cited

U.S. PATENT DOCUMENTS

| | | | |
|---|---|---|---|
| 6,707,421 B1* | 3/2004 | Drury | G01C 21/34 |
| | | | 342/357.31 |
| 7,391,341 B2 | 6/2008 | Keaveny et al. | |
| 7,496,444 B1 | 2/2009 | Fried | |
| 7,650,234 B2 | 1/2010 | Obradovich et al. | |
| 7,957,871 B1 | 6/2011 | Echeruo | |
| 8,095,303 B1* | 1/2012 | Nesbitt | G01C 21/343 |
| | | | 340/988 |
| 8,108,501 B2 | 1/2012 | Birnie et al. | |
| 8,138,907 B2 | 3/2012 | Barbeau et al. | |
| 8,188,859 B1 | 5/2012 | Emigh | |
| 8,255,159 B1 | 8/2012 | Bierbaum et al. | |
| 8,301,371 B2 | 10/2012 | Sheha et al. | |
| 8,400,294 B2 | 3/2013 | Bishop et al. | |
| 8,401,786 B2 | 3/2013 | Poppen et al. | |
| 8,433,341 B2 | 4/2013 | Dredge | |
| 8,467,957 B2 | 6/2013 | Brandis, Jr. | |
| 8,645,050 B2 | 2/2014 | Gontmakher et al. | |
| 8,655,582 B2* | 2/2014 | Philbin | G06Q 10/02 |
| | | | 701/400 |
| 8,676,489 B2 | 3/2014 | Cheung et al. | |
| 8,779,949 B2 | 7/2014 | Bouillet et al. | |
| 8,825,376 B1 | 9/2014 | Szybalski et al. | |
| 8,868,343 B1 | 10/2014 | Caine et al. | |
| 8,972,177 B2 | 3/2015 | Zheng et al. | |
| 9,074,893 B2 | 7/2015 | Kim et al. | |
| 9,159,238 B2 | 10/2015 | Manolescu | |
| 9,177,472 B2 | 11/2015 | Kim et al. | |
| 9,204,251 B1 | 12/2015 | Mendelson | |
| 9,212,924 B1 | 12/2015 | Salowitz | |
| 9,593,957 B2 | 3/2017 | Zheng et al. | |
| 2003/0229441 A1* | 12/2003 | Pechatnikov | G01C 21/26 |
| | | | 701/411 |
| 2005/0021231 A1 | 1/2005 | Matsuda et al. | |
| 2006/0149466 A1 | 7/2006 | Kikuchi et al. | |
| 2006/0184314 A1 | 8/2006 | Couckuyt et al. | |
| 2006/0289624 A1 | 12/2006 | Olmos et al. | |
| 2007/0129055 A1 | 6/2007 | Ehlers | |
| 2007/0291034 A1 | 12/2007 | Dones | |
| 2008/0002190 A1 | 1/2008 | Romain et al. | |
| 2008/0059061 A1 | 3/2008 | Lee | |
| 2008/0275646 A1 | 11/2008 | Perng et al. | |
| 2008/0319644 A1 | 12/2008 | Zehler | |
| 2009/0119001 A1 | 5/2009 | Moussaeiff et al. | |
| 2009/0299619 A1 | 12/2009 | Dean et al. | |
| 2010/0004805 A1 | 1/2010 | Denis et al. | |
| 2010/0094537 A1 | 4/2010 | Goto et al. | |
| 2010/0109918 A1 | 5/2010 | Liebermann | |
| 2010/0145922 A1 | 6/2010 | Yoon et al. | |
| 2010/0235082 A1 | 9/2010 | Taniyama et al. | |
| 2010/0268450 A1 | 10/2010 | Evanitsky et al. | |
| 2010/0305842 A1 | 12/2010 | Feng | |
| 2011/0022304 A1 | 1/2011 | Lee et al. | |
| 2011/0022308 A1 | 1/2011 | Britton | |
| 2011/0130956 A1 | 6/2011 | Tracton et al. | |
| 2011/0172909 A1 | 7/2011 | Kahn et al. | |
| 2011/0257877 A1 | 10/2011 | Liu et al. | |
| 2011/0301832 A1 | 12/2011 | Zheng et al. | |
| 2012/0004841 A1 | 1/2012 | Schunder et al. | |
| 2012/0066202 A1 | 3/2012 | Hatazawa et al. | |
| 2012/0111222 A1 | 5/2012 | Zambelli et al. | |
| 2012/0143501 A1* | 6/2012 | Tang | G01C 21/3476 |
| | | | 701/465 |
| 2012/0221168 A1 | 8/2012 | Zeng et al. | |
| 2012/0310520 A1 | 12/2012 | Kanno et al. | |
| 2013/0073202 A1 | 3/2013 | Zheng et al. | |
| 2013/0200992 A1 | 8/2013 | Kim | |
| 2013/0321466 A1* | 12/2013 | Kocienda | G01C 21/26 |
| | | | 345/635 |
| 2013/0335227 A1 | 12/2013 | Iida | |
| 2014/0005921 A1 | 1/2014 | Voronel et al. | |
| 2014/0081881 A1 | 3/2014 | Radhakrishnan | |
| 2014/0181715 A1 | 6/2014 | Axelrod et al. | |
| 2014/0188788 A1 | 7/2014 | Bridgen et al. | |
| 2014/0200805 A1 | 7/2014 | Modica et al. | |
| 2014/0229107 A1 | 8/2014 | Didjusto et al. | |
| 2014/0249747 A1 | 9/2014 | Kosseifi et al. | |
| 2014/0278616 A1 | 9/2014 | Stone et al. | |
| 2014/0372904 A1 | 12/2014 | Liu et al. | |
| 2015/0006072 A1 | 1/2015 | Goldberg et al. | |
| 2015/0015024 A1 | 1/2015 | Cremers et al. | |
| 2015/0051832 A1 | 2/2015 | Modica et al. | |
| 2015/0070131 A1 | 3/2015 | Beaurepaire et al. | |
| 2015/0142302 A1 | 5/2015 | Kudo | |
| 2015/0204685 A1* | 7/2015 | Gearhart | G01C 21/36 |
| | | | 701/533 |
| 2015/0285649 A1 | 10/2015 | Zhang et al. | |
| 2015/0369623 A1* | 12/2015 | Blumenberg | G01C 21/367 |
| | | | 701/532 |
| 2016/0061617 A1* | 3/2016 | Duggan | G01C 21/3679 |
| | | | 701/538 |
| 2016/0231129 A1 | 8/2016 | Erez et al. | |
| 2016/0260436 A1 | 9/2016 | Lemay et al. | |
| 2017/0328728 A1 | 11/2017 | Salowitz et al. | |
| 2017/0329780 A1 | 11/2017 | Salowitz | |
| 2017/0370735 A1 | 12/2017 | Salowitz | |

FOREIGN PATENT DOCUMENTS

| | | |
|---|---|---|
| EP | 2244064 A1 | 10/2010 |
| EP | 2750417 A1 | 7/2014 |
| EP | 3012589 A1 | 4/2016 |
| KR | 20160112805 A | 9/2016 |

OTHER PUBLICATIONS

Mitchell, Thor, "Search along a route made easy with RouteBoxer", Published on: May 11, 2010 Available at: http://googlegeodevelopers.blogspot.in/2010/05/search-along-route-made-easy-with.html.

Fogerty, Colleen, "Road Trip Planner with Stops: Tools & Tips for a Perfect Road Trip", Published on: Dec. 24, 2014 Available at: http://www.tripit.com/blog/2014/12/road-trip-planner-with-stops.html.

"RouteFast", Published on: Dec. 18, 2014 Available at: http://www.routefast.com/.

"International Search Report and Written Opinion Issued in PCT Application No. PCT/US2017/031461", dated Jul. 27, 2017, 13 Pages.

"Final Office Action Issued in U.S. Appl. No. 15/151,246", dated: Dec. 28, 2017, 32 Pages.

"Non Final Office Action Issued in U.S. Appl. No. 15/151,246", dated: Mar. 28, 2018, 47 pages.

"Non Final Office Action Issued in U.S. Appl. No. 15/151,246", dated: May 2, 2017, 27 Pages.

"Non Final Office Action Issued in U.S. Appl. No. 15/191,402", dated: Jul. 18, 2017, 10 pages.

"Notice of Allowance Issued in U.S. Appl. No. 15/191,402", dated: May 1, 2018, 10 pages.

"Is There a Way to Search for Stuff Along a Route", Retrieved from https://productforums.google.com/forum/#!topic/maps/1Lal3r1B6ps, Aug 27, 2013, 1 Page.

"See Traffic, Transit, Bicycling, and Terrain on the Map", Retrieved from https://support.google.com/maps/answer/3092439?hl=en, 3 Pages.

Barker, "Using Here for Android to Get Around with Transit and on Foot", Retrieved from https://360.here.com/2014/10/22/using-android-get-around-transit-foot/, Oct 22, 2014, 12 Pages.

Foell, "Micro-Navigation for Urban Bus Passengers: Using the Internet of Things to Improve the Public Transport Experience", in Proceedings of the First International Conference on IoT in Urban Space, Oct 27, 2014, 6 Pages.

(56) References Cited

OTHER PUBLICATIONS

Hunter, "The Path Intference Filter: Model-Based Low-Latency Map Matching of Probe Vehicle Data", Algorithmic Foundations of Robotics X, Jun. 20, 2012, 23 Pages.

Leber, "A Mapping App That Searches Along Your Route to Plan Exciting (or Efficient) Trips", Retrieved from https://www.fastcompany.com/3035205/a-mapping-app-that-searches-along-your-route-to-plan-exciting-Or-efficient-trips, Sep 10, 2014, 3 Pages.

"International Search Report and Written Opinion Issued in PCT Application No. PCT1US171030706", dated: Sep. 19, 2017, 15 Pages.

"International Search Report and Written Opinion Issued in PCT Application No. PCT/US2017/030707", dated: Sep. 20, 2017, 13 Pages.

"International Search Report and Written Opinion Issued in PCT Application No. PCT/US2017/037084", dated: Sep. 12, 2017, 13 Pages.

Potts, "A Guide for Planning Operating Flexible Public Transportation Services", in Technical Report 140 of Transit cooperative Research Program, Jul. 23, 2015, 98 Pages.

Welch, "iOS 9 Brings Public Transit Directions to Apple Maps", Retrieved from https://www.theverge.com/2015/6/8/8731953/ios-9-transit-directions-apple-maps-announced, Jun. 8, 2015, 3 pages.

"Non Final Office Action Issued in U.S. Appl. No. 15/151,178", dated: Aug. 9, 2018, 13 Pages.

"Final Office Action Issued in U.S. Appl. No. 15/151,246", dated: Oct. 12, 2018, 49 Pages.

\* cited by examiner

CALCULATING AN OPTIMAL ROUTE BASED ON SPECIFIED INTERMEDIATE STOPS

BACKGROUND

Use of navigation assistance technology to help individuals get from one place to another is widespread. For instance, automobiles, mobile phones, and even wrist watches may include navigation functionality to provide maps, directions, and searches for points of interest (POIs). The navigation assistance technologies allow users to plan trips, obtain directions and even provide updates regarding a user's location while travelling. Navigation assistance technologies may also enable users to "search along a route" for POIs (e.g., gas, restaurant, park, hotel, grocery store, coffee, etc.) in connection with a planned route between start and end points. Traditionally, searches along a route begin with an already established route and then find POIs along a route based on search criteria. In this approach, a selected POI(s) is added as an intermediate stop in the established route by detouring away from and then back to the established route. In scenarios in which a user is searching for a particular type of location with multiple possible location options (e.g., Costco, hardware store, coffee shop) and does not prefer/designate a specific location, starting with the established route (e.g., computing the route first) may result in a less than optimal route. This inefficiency occurs because the pre-established route creates an additional constraint on the search and when the intermediate stop criteria are introduced, existing algorithms are not configured to deviate from the already established route and/or fail to consider whether an alternative overall route including the specified stop would be more efficient.

SUMMARY

Calculating an optimal route based on specified intermediate stops is described herein. In one or more implementations, a map navigation application is configured to compute a route from a start point to an end point in dependence upon criteria specifying one or more intermediate stops. In an example, a request is received to search between a start point and an end point for a route with an intermediate stop that satisfies search criteria indicating at least a type of location. In response to the search, search results are obtained with multiple route options between the start point and end point including intermediate stops that satisfy the search criteria. An optimal route is then selected from the multiple route options based upon defined optimization criteria used to score and rank the options. Optimization criteria may include but are not limited to factors to account for overall distance, overall travel time, traffic, weather conditions, date and time, fuel economy, distance and/or time to reach the intermediate stop, and so forth.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
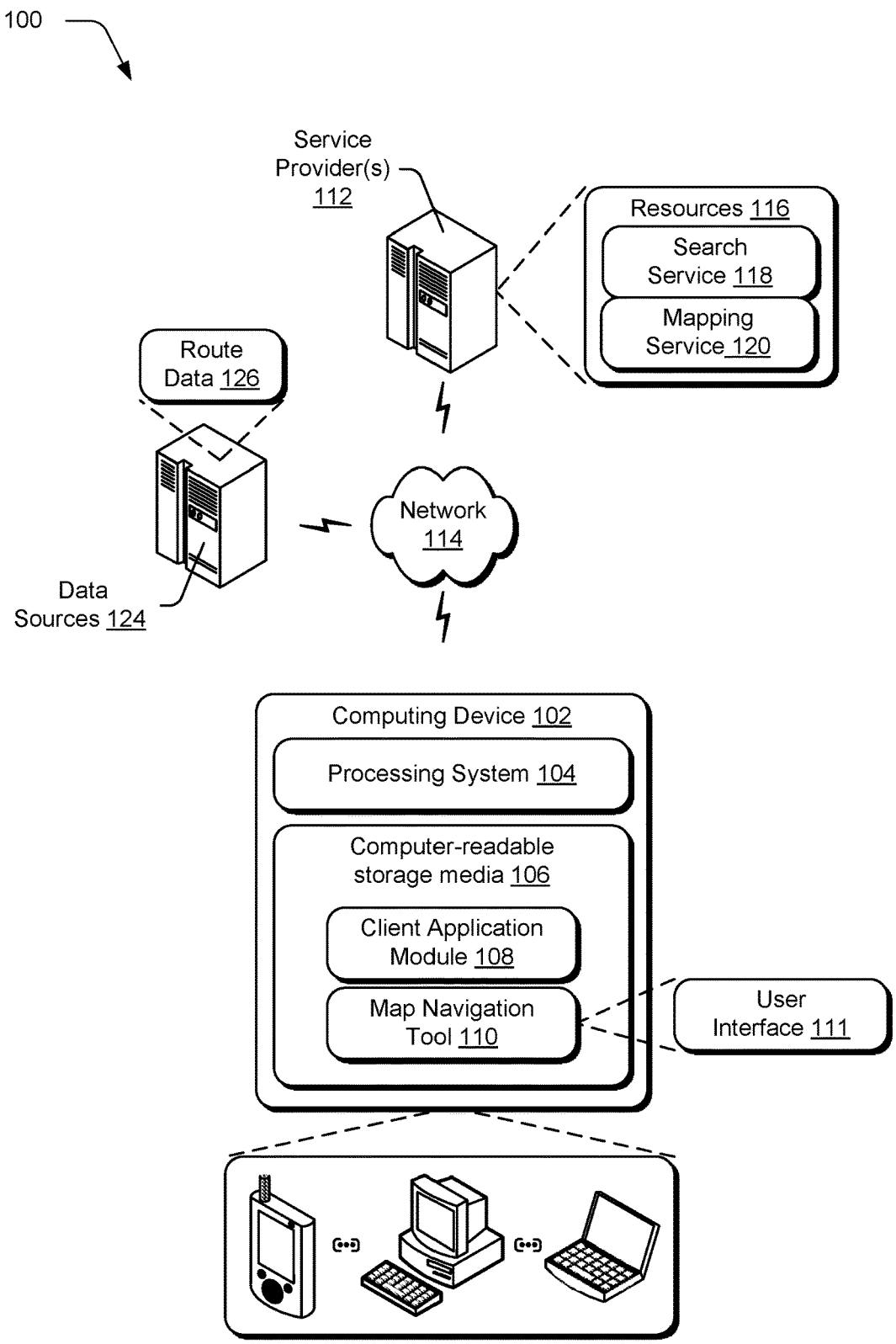
FIG. 1 is an illustration of an environment in an example implementation that is operable to employ techniques described herein.

In scenarios in which a user is searching for a particular type of location with multiple possible options (e.g., Costco, hardware store or coffee shop) and does not prefer or designate a specific location, starting with an already established route (e.g., computing the route first) may result in a less than optimal route. This inefficiency occurs because the route creates an additional constraint on the search, and when the intermediate stop criteria are introduced, existing algorithms are not configured to deviate from the established route and may fail to consider whether an alternative overall route would be more efficient given the additional stop.

Calculating an optimal route based on specified intermediate stops is described herein. In one or more implementations, a map navigation application is configured to compute a route from a start point to an end point in dependence upon criteria specifying one or more intermediate stops. The "best" route or routes are determined given a number of possible location results for the stop(s) that match the criteria. Accordingly, rather than selecting a route first and then adding a stop into the pre-established route, the initial route determination incorporates consideration of the one or more specified intermediate stops as part of calculating the route. In an example, a request is received to search between a start point and an end point for an intermediate stop that satisfies search criteria indicating at least a type of location. In response to the search, search results are obtained with multiple options for routes between the start point and an end point including intermediate stops that satisfy the search criteria. An optimal route is then selected from the multiple route options based upon defined optimization criteria. Optimization criteria may include but are not limited to distance, travel time, traffic data, weather conditions, date and time, and so forth.

Considering the specified intermediate stops as part of the initial route determination in accordance with techniques described herein enables the system to consider a wider range of route options and optimize route selection for a given set of constraints. Since an optimal route with the stops is selected upfront, the amount of processing power and computation time consumed may also be reduced relative to traditional route search approaches. Additionally, providing optimal routes quickly and efficiently using the described techniques may result in increased user satisfaction with the mapping application, device, and/or developer.

In the following discussion, an example environment is first described that may employ the techniques described herein. Example procedures and implementation details are then described which may be performed in the example environment as well as other environments. Consequently, performance of the example procedures and details is not limited to the example environment and the example environment is not limited to performance of the examples procedures and details.

Example Environment

FIG. 1 is an illustration of an environment 100 in an example implementation that is operable to employ techniques described herein. The illustrated environment 100 includes a computing device 102 including a processing system 104 that may include one or more processing devices, one or more computer-readable storage media 106 and a client application module 108 embodied on the computer-readable storage media 106 and operable via the processing system 104 to implement corresponding functionality described herein. In at least some embodiments, the client application module 108 may represent a browser of the computing device operable to access various kinds of web-based resources (e.g., content and services). The client application module 108 may also represent a client-side component having integrated functionality operable to access web-based resources (e.g., a network-enabled application), browse the Internet, interact with online services, and so forth.

The computing device 102 may be configured as any suitable type of computing device. For example, the computing device may be configured as a desktop computer, a laptop computer, a mobile device (e.g., assuming a handheld configuration such as a tablet or mobile phone), a tablet, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 10.

The computing device 102 may also include or make use of a map navigation tool 110 that represents functionality operable to implement techniques related to mapping as described above and below, including but not limited to navigation, route searches, point of interest searches, and other mapping operations. The map navigation tool 110 may be implemented as a software module, a hardware device, or using a combination of software, hardware, firmware, fixed logic circuitry, etc. The map navigation tool 110 may be implemented as a standalone component of the computing device 102 as illustrated. In addition, or alternatively, the map navigation tool 110 may be configured as a component of the client application module 108, an operating system, or other device application. For example, map navigation tool 110 may be provided as a plug-in and/or downloadable script for a browser. Map navigation tool 110 may also represent script contained in or otherwise accessible via a webpage, web application, or other resources made available by a service provider.

In accordance with techniques described herein, the map navigation tool 110 is operable to access and utilize various available services and sources of data to facilitate navigation and mapping activities. For instance, the map navigation tool 110 performs operations to access device location data, obtain map data, generate maps, compute routes, provide navigational information, conduct searches based on input criteria, rank and output search results, and so forth. Maps, search results, route views, and other outputs generated via the map navigation tool 110 may be exposed via a user interface 111 output by the map navigation tool 110, or output by another application for which the map navigation tool 110 is configured to provide functionality for mapping and navigation.

The map navigation tool 110 is further configured to conduct route searches route in dependence upon specified intermediate stops as discussed above and below. For instance, the map navigation tool 110 may obtain input indicating a start point, an end point, and search criteria indicating a type of stop to include in a route. One or more route options that satisfy the search criteria are calculated. Route search calculations to find the routes options are not constrained to a pre-established route that is set between the start and end prior to considering the specified intermediate stops. Rather, the route search calculations consider the intermediate stop(s) upfront as part of choosing the route and without dependence upon a pre-established route.

The route options may be automatically compared one to another by the map navigation tool 110 to select an optimal route based on optimization criteria. In addition or alternatively, the map navigation tool 110 may be configured to expose route options to a user via a user interface to facilitate selection of one of the routes to set as the current route. Once a route has been set, the map navigation tool 110 operates to provide in-route guidance such as audio prompts, navigational instructions, turn alerts, in-route data, map views of the route, and so forth. Details regarding these and other aspects of techniques to calculate an optimal route based on specified intermediate stops are discussed below.

The environment 100 further depicts one or more service providers 112, configured to communicate with computing device 102 over a network 114, such as the Internet, to provide a "cloud-based" computing environment. Generally, speaking a service provider 112 is configured to make various resources 116 available over the network 114 to clients. In some scenarios, users may sign-up for accounts that are employed to access corresponding resources from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and/or content typically made available over a network by one or more providers. Some examples of services include, but are not limited to, a photo editing service, a web development and management service, a collaboration service, a social networking service, a messaging service, an advertisement service, and so forth. Content may include various combinations of text, video, ads, audio, multi-media streams, animations, images, web documents, web pages, applications, device applications, data APIs, and the like.

By way of example, the service provider is illustrated as including a search service 118 and a mapping service 120. The map navigation tool 110 is configured to invoke the search service 118 and/or mapping service 120 to perform searches as described above and below. The search service 118 may operate to conduct searches based on specified criteria. The search service 118 includes functionality to search across various data sources to find and return results that match specified search criteria. The search service 118 is further configured to perform searches related to navigation and mapping including searches for directions, POIs, and so forth. The mapping service 120 represents functionality operable to access and obtain navigation and mapping data including map views, route information, distances, waypoints, navigation instructions, and so forth. The search service 118 and mapping service 120 may each access and rely upon data from various data sources 124 including various different resources associated with service provider and/or resources made accessible via third party providers. Such data may include route data 126 as illustrated. The data sources 124 may additionally provide access to collections, social network data, POI data, map data/services, and other data that may be used to generate search results and navigation/mapping data for use by clients.

Figure 2:
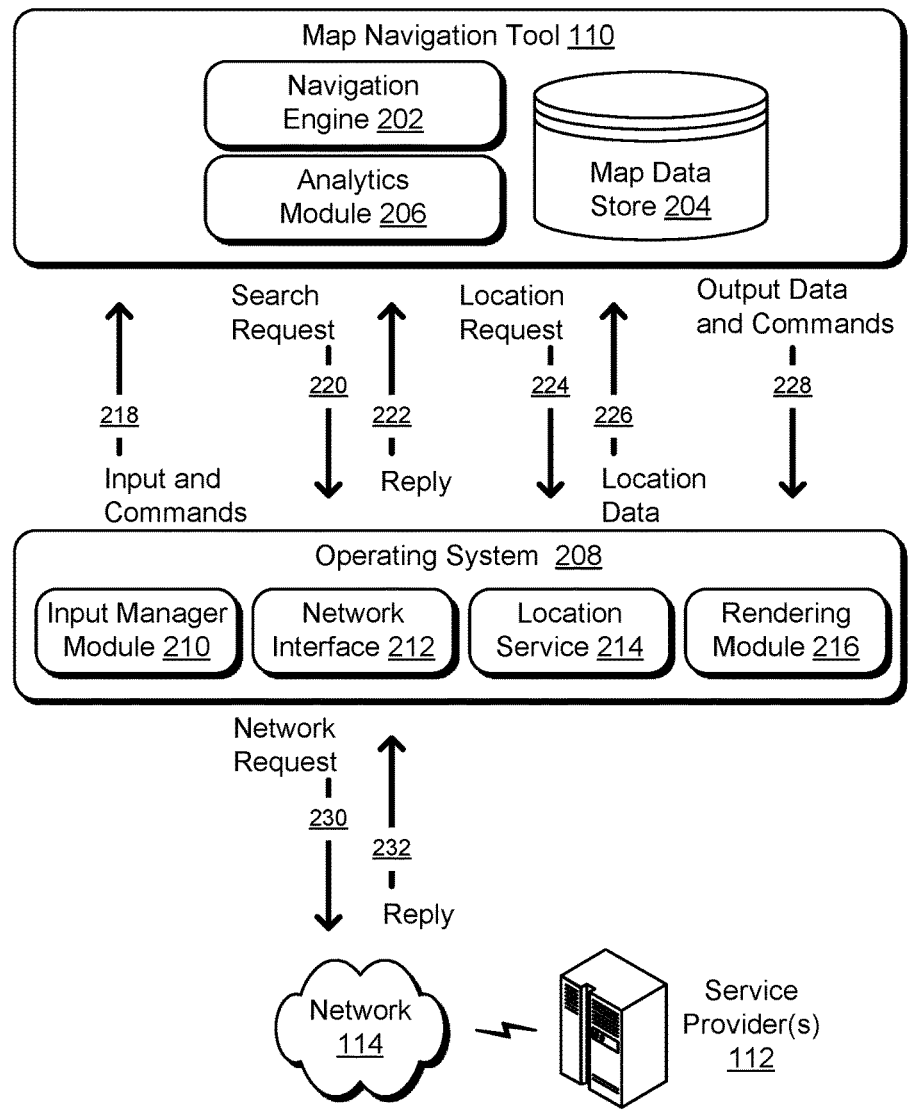
FIG. 2 is a diagram depicting an example configuration of a map navigation tool in accordance with one or more implementations.

In this context, FIG. 2 depicts generally at 200 an example configuration of a map navigation tool 110 in accordance with one or more implementations. In this example, the map navigation tool 110 includes a navigation engine 202, map data store 204, and analytics module 206 operable in conjunction with an operating system 208 to provide navigation and mapping functionality. A client computing device (e.g., smartphone, mobile device, in-dash device, or other computing device 102) can execute software for the map navigation tool 110 and the operating system 208 to provide various navigation/mapping functionality including at least calculation of routes based on specified intermediate stops as discussed in this document.

The operating system 208 manages user input functions, output functions, storage access functions, network communication functions, and other functionality for the device. The operating system 208 provides the map navigation tool 110 access to such functions through various components and interfaces. For instance, the operating system 208 includes an input manager module 210 for input processing, a network interface 212 for networking, a location service 214 for location tracking through GPS or otherwise, and a rendering module 216 for rendering outputs (e.g., rendering visual output to a display, generating voice output for a speaker).

A user can generate user input that specifies and controls map navigation. In particular, input manager module 210 represents functionality to obtain and process various types of input including touchscreen input, button or key presses and voice input. Thus, the OS includes functionality for recognizing taps, finger gestures, etc. to a touchscreen from tactile input, recognizing commands from voice input, button input or key press input, and creating signals/messages to control and direct operation of the map navigation tool 110 and/or other software. Input and commands 218 generated based on detected input are conveyed to the map navigation tool 110 for handling via the navigation engine 202.

The navigation engine 202 represents functionality to implement various navigation and mapping operations. The navigation engine 202 may rely upon cached map data and/or a map database that is stored locally in the map data store 204. The navigation engine 202 may also invoke the analytics module 206 to perform analysis including input interpretation, ranking and sorting of search results, generation of navigation instruction, route calculation, and so forth. Further, the navigation engine 202 in conjunction with the analytics module 206 provides functionality to form search requests 220 and obtain replies 222. The search requests 220 may be directed to appropriate network resources and servers via the network interface 212. Additionally, the navigation engine 202 may form location requests 224 and obtain location data 226 from the location service 214 based on the requests. The location data is used to inform navigation and mapping operations, such as showing a current position, computing distances, routing calculations, and so forth.

For navigation, the navigation engine 202 considers a current view position and any input that indicates a desired change in the view position, map data and location data. From this information, the navigation engine 202 determines a view position and provides the view position as well as location data and map data in the vicinity of the view position for rendering via the rendering module 216. In particular, the navigation engine 202 sends output data and commands 228 to direct operation of the rendering module 216 to cause corresponding output via a user interface 111, or otherwise. The location data 226 indicates a current location (of the computing device 102) that aligns with the view position, or the view position can be offset from the current location. The navigation engine 202 gets current location data for the computing device from the location service 214, which may determine the current location data through interaction with various components of the computing device. For example, the location data can be determined based upon data from a global positioning system (GPS), by triangulation between towers of a cellular network using cellular hardware, by reference to physical locations of Wi-Fi routers in the vicinity via a Wi-Fi radio, or by another location mechanism.

As noted, the navigation engine 202 can obtain at least some map data for a map from a map data store 204. In general, the map data can include photographic image data or graphical data (for boundaries, roads, etc.) at various levels of detail, ranging from high-level depiction of states and cities, to medium-level depiction of neighborhoods and highways, to low-level depiction of streets and buildings. Aside from photographic data and graphical data, the map data can include graphical indicators such as icons or text labels for place names of states, cities, neighborhoods, streets, buildings, landmarks or other features in the map. Additionally, the map data can also include distances between features, route points (in terms of latitude and longitude) that define a route between start and destination points, text directions for decisions at waypoints along the route (e.g., turn at Sandy Shores, Ln), and distances between waypoints along the route. The map data can provide additional details for a given feature such as contact information (e.g., phone number, Web page, address), reviews, ratings, other commentary, menus, photos, advertising promotions, or information for games (e.g., geo-caching, geo-tagging). Links can be provided for Web pages, to launch a Web browser and navigate to information about the feature. The map data store 204 may be configured to cache recently used map data and/or maintain a local map library. As needed, the map data store 204 accesses additional or updated map data from local file storage or from network resources. The OS mediates access to the storage and network resources.

For example, to determine directions for a route, the map navigation tool 110 ascertains a start point (typically, the current location of the computing) and an end point for a destination (e.g., an address or other specific location) as part of a request for map data. The device OS conveys the request over a network 114 as a network request 230 to one or more services implemented by service providers 112. The network request 230 is processed to generate and return a reply 232 with surface layer data, route points that define a route, text directions for decisions at waypoints along the route, distances between waypoints along the route, and/or other map data included in the reply 232. The OS in turn conveys the reply 232 with the various map data as a reply 222 for handling via the map navigation tool 110. The map data may be stored within the map data store 204 and/or communicated directly to the navigation engine 202 or analytics module 206.

As another example, as a user travels along a route, the map navigation tool 110 gets additional map data from the map data store 204 for rendering. The map data store 204 may cache detailed map data for the vicinity of the current location, using such cached data to incrementally change the rendered views. The map navigation tool 110 can pre-fetch map data along the route, or part of the route. Thus, as the rendered map views are updated to account for changes to the current location, the map navigation tool 110 often updates the display without the delay of requesting/receiving new map data from a server. As needed, the map navigation tool 110 requests additional map data to render views.

The rendering module 216 processes the view position, location data and map data, and renders a view of the map via a user interface 111 or otherwise. Depending on the usage scenario, the rendering module 216 renders map data from local storage, map data from a network server, or a combination of map data from local storage and map data from a network server. In general, the rendering module 216 provides output commands for the rendered view to the device OS for output on via a display, speakers, and/or other output device. The map navigation tool 110 reacts to changes in the location of the computing device and/or user input that indicates a change in view position, a change in the top item in a list of directions for a route, or other changes. The rendered map view is updated based on the changes. POIs, instructions, annotations, labels, and other search results exposed in connection with a map view or particular query are also updated as the view changes. Results of a search may also be shown in a list of results using a results pane, a side bar, a pop-up window or other suitable user interface instrumentality.

Having considered an example environment, consider now a discussion of some example details of techniques for calculating an optimal route based on specified intermediate stops in accordance with one or more implementations.

Collection-Based Search Along a Route Details

This section describes some example details in accordance with one or more implementations in relation to some example scenarios, procedures, and user interfaces of FIGS. 3-9. The procedures discussed below are represented as sets of blocks that specify operations performed by one or more devices and are not necessarily limited to the orders shown for performing the operations by the respective blocks. Aspects of the procedures may be implemented in hardware, firmware, or software, or a combination thereof. Some aspects of the procedures may be implemented via one or more servers, such as via a service provider 112 that maintains and provides access to a search service 118, mapping service 120 and other resources 116. Aspects of the procedures may also be performed by a suitably configured device, such as the example computing device 102 of FIG. 1 that includes or makes use of a map navigation tool 110 and/or a client application module 108.

In general, functionality, features, and concepts described in relation to the examples above and below may be employed in the context of the example procedures described below. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 3:
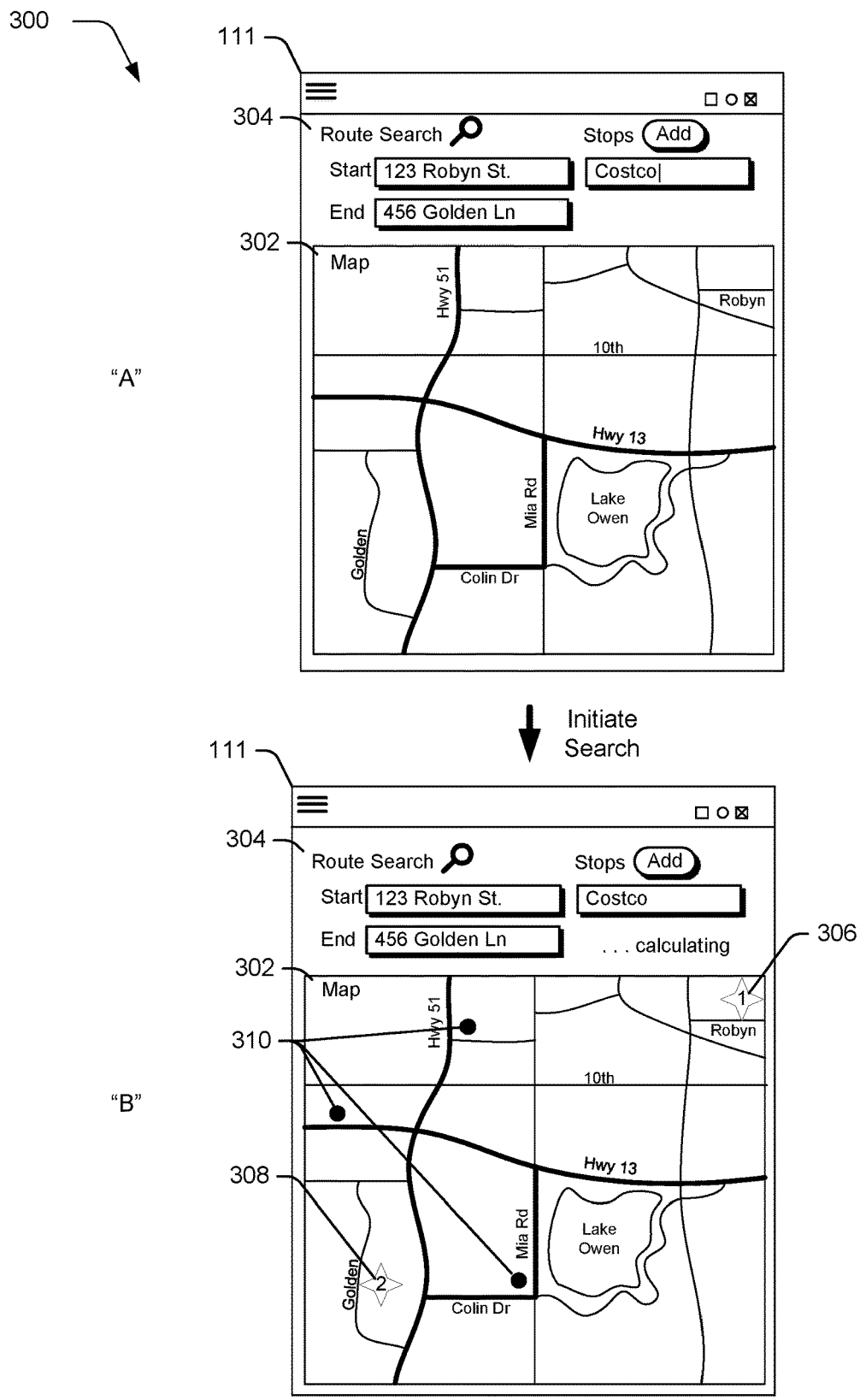
FIG. 3 is a diagram depicting an example scenario for a search to find a specified intermediate stop in accordance with one or more implementations.

As noted, a map navigation tool 110 may be configured to conduct route searches route in dependence upon specified intermediate stops. In this context, FIG. 3 depicts generally at 300 a diagram showing an example scenario for a search to find a specified intermediate stop in accordance with one or more implementations. In general, the map navigation tool 110 operates to establish a route based on as set of constraints and present a map view of the route via a corresponding user interface 111. In the represented example, the view "A" represents a UI that may be rendered responsive to input obtained to initiate a route search in connection with a map view 302.

Route search functionality 304 provided via the UI enables input of search parameters including designation of a start point, end point, and criteria specifying one or more intermediate stops. Various configurations of a UI and different UI instrumentalities and controls to facilitate route searches are contemplated. By way of example and not limitation, the example UI in view "A" includes route search functionality 304 having input boxes to enter start and end locations. The route search functionality 304 also includes a control to specify one or more intermediate stops. For example, an add button enables a user to add an input box to specify criteria for an intermediate stop. The add button may be selected to enable input of one or multiple stops via corresponding elements exposed in the UI. In contrast to traditional route search techniques, the map navigation tool 110 employs the constraints specified for the stops via the UI to calculate the route instead of first finding a route and then searching along the route. Constraints specified for the stops may indicate a location category/type (coffee shop, hardware, groceries) or specific business/place (e.g., Starbucks, Home Depot, Safeway) for which multiple distinct location options may exist. This kind of search based on a type or category may occur if the user is looking for a stop within a given type/category and does not specify a particular location or address.

In other words, an optimal route between points is determined based on multiple options found for a specified stop. The approach may be extended to multiple specified stops by selecting a route given sets of possible options for each of the multiple stops. Taking this approach eliminates constraints placed on the analysis by establishing the route first and allows for consideration of more route options up front. Consequently, an "optimal" route that includes one or more specified intermediate stops can be ascertained by considering multiple route options and comparing the options based on designated optimization criteria used to score and rank the options one to another. The optimal route is determined without constraining the calculation to a pre-established route between the start point and end point. Various optimization criteria may be specified including but not limited to distance, travel time, traffic, weather conditions, date and time, and so forth.

By way of example, the scenario represented in FIG. 3 represents searching for a route between a start specified as "123 Robyn St." and a destination specified as "456 Golden Ln." Further, search criteria are designated for an intermediate stop at "Costco." In this example, a user may desire to stop a Costco to pick-up supplies on the way from home to work. In this case, input of "Costco" represents a search within a category or for a location type, which may have multiple possible locations/options. Thus, a search may be initiated explicitly by a user using search functionality 304 exposed via the user interface 111.

In this approach, a user may enter particular search criteria, such as categories (e.g., park, restaurant, gas), specific place or business names, distance or time constraints, and so forth. Then, the user takes action to initiate the search by pressing enter or a selection of another particular control configured to operate as a trigger for the search. The search may be constrained to an established search area associated with the route. For example, an example search area may be established according to a predefined and/or configurable parameter that sets boundaries for the search. For instance, the predefined and/or configurable parameter may define boundaries in terms of distance or time. Based on the search area parameter(s), a search area may be defined in relation to boundaries of the map view 302, a bounding box formed based on locations of the start location and end location, a set distance/time radius relative to a center point of a line between the start and end points, radii from coordinate points along a line between the start location and end location, specified constraints, and so forth. Thus, a search area may be established according to one or more configurable parameters that set boundaries for the search, and then a search for intermediate stops and routes that satisfies the search criteria is conducted within the search area.

In the represented example, the view "B" represents a set of search results matching the search criteria that may be obtained and/or rendered via the user interface 111 responsive to initiation of the search. As represented in view B, search results may be presented in the map view, such as exposing indicators to represent locations of the start point 306, end point 308, and one or more options for intermediate stops 310 derived according to the search criteria. In this example, three possible options for intermediate stops 310 corresponding to the input "Costco" are returned. While indicators as represented in view "B" may be displayed in a map view as shown, it is noted that generation of the search results occurs as part of calculating a route and as such the results/options may not necessarily be presented in the map view. Rather, the search results may be used to compute an optimal route in the background, after which the computed route and appropriate indicators corresponding to the computed route may be shown in the map view. The location indicators associated with background operations are depicted in relation to some examples herein to facilitate a better understanding of the inventive concepts and details.

As may be observed with reference to view "B" of FIG. 3, numerous possible routes between the start point 306 and end point 308 may exist that include one of the options for intermediate stops 310. In accordance with techniques discussed herein, the options for intermediate stops are considered as part of the initial route determination. This enables the system to consider a wider range of route options and optimize route selection for a given set of constraints. In contrast, a different and less optimal route may be selected if the route is computed first and then the intermediate stops are considered since the initial route is already "locked-in." To illustrate, consider the further example depicted and described in relation to FIGS. 4 to 6.

Figure 4:
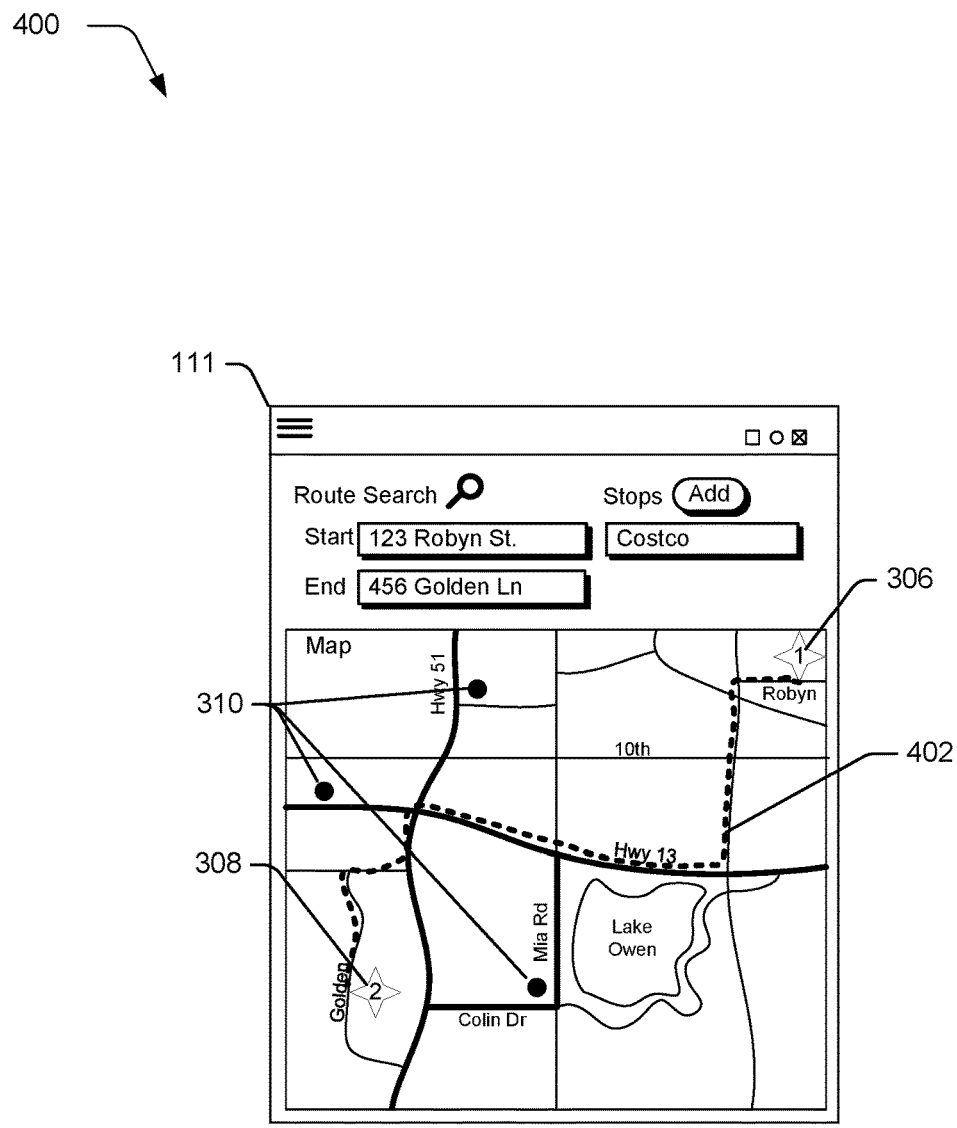
FIG. 4 is a diagram depicting details of an example user interface presenting search results in relation to a route in accordance with one or more implementations.
Figure 5:
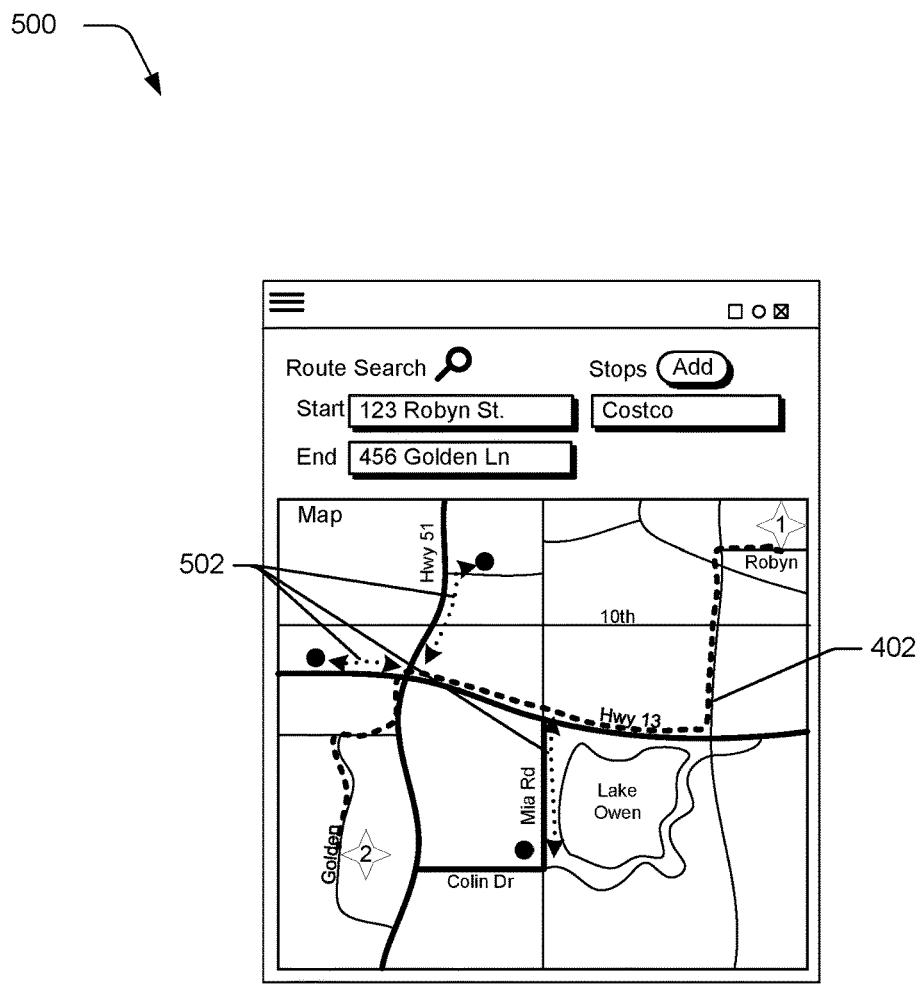
FIG. 5 is a diagram depicting details of an example user interface showing possible route options related to an established route in accordance with one or more implementations.

In particular, FIG. 4 depicts generally at 400 details of an example user interface presenting search results in relation to a route in accordance with one or more implementations. In this example, the user interface 111 represent a route 402 that is established first before the intermediate stops are considered. In this example, the route 402 may be optimized according to criteria such as shortest distance or minimum travel time. The possible intermediate stops 310 are then found and considered in relation to the already established route. This approach based on a pre-established route is represented in FIG. 5, which depicts generally at 500 an example user interface showing possible route options related to a pre-established route in accordance with one or more implementations. In particular, various out and back extensions 502 of the route to incorporate an intermediate stop are shown in the example. These extensions 502 are derived in relation to the constraint of the existing route as opposed to considering the intermediate stops as part of the initial route determination. Consequently, the process uses a traditional search along a route that may result in a less than optimal route.

Figure 6:
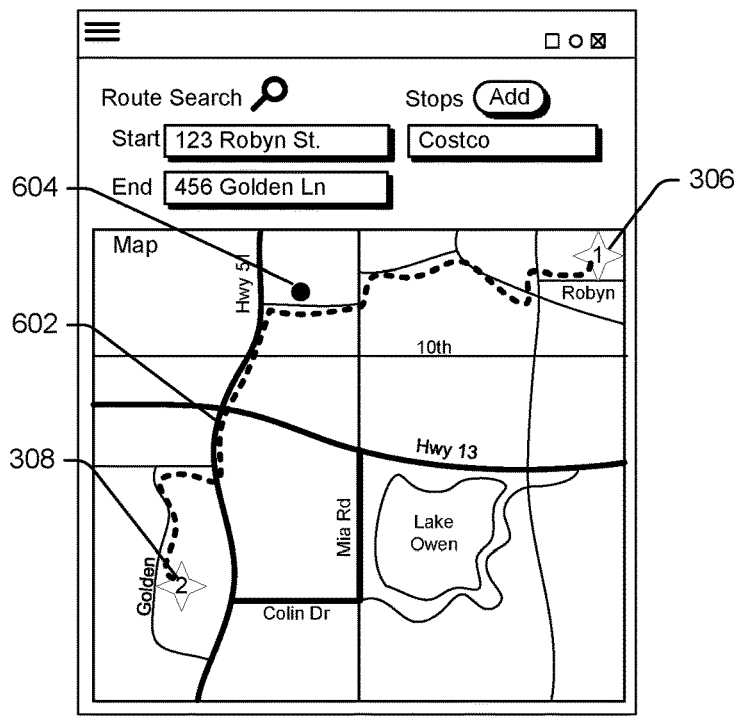
FIG. 6 is a diagram depicting details of an example user interface showing an optimal route calculated in consideration of a specified intermediate stop in accordance with one or more implementations.

On the other hand, FIG. 6 is a diagram depicting generally at 600 details of an example user interface showing an optimal route calculated in consideration of a specified intermediate stop in accordance with one or more implementations. In this example, the optimal route 602 is arrived at using the described techniques to consider possible stops relative to specified optimization criteria for route selection. Optimization criteria may include a combination of considerations including factors related to one or more of overall distance, travel time, traffic data, weather conditions, date and time, fuel economy, safety, know construction/accidents/delays, distance/time to reach the stop, and so forth. Optimization criteria are applied to pick a selected stop 604 from the options for intermediate stops 310 as part of computing the optimal route 602. For example, the route may be selected as the shortest route or the fastest route that includes the specified stop. Other considerations, such as fuel consumption and driving conditions may also be factored in. Notice that the optimal route 602 computed as discussed herein may be different than the route 402 that is selected first, as can be observed by comparing the routes of FIG. 4 and FIG. 6. Again, the optimization occurs by eliminating the constraint of the already established route and thereby evaluating a wider range of options as part of the initial route determination. In other words, instead of finding a stop C of a specified type/category along an established route between A and B, the system finds an optimal route that includes a stop C in a specified type/category by considering different route options between A and B that satisfy the constraints. Additional details are discussed in relation to the following example procedures.

Figure 7:
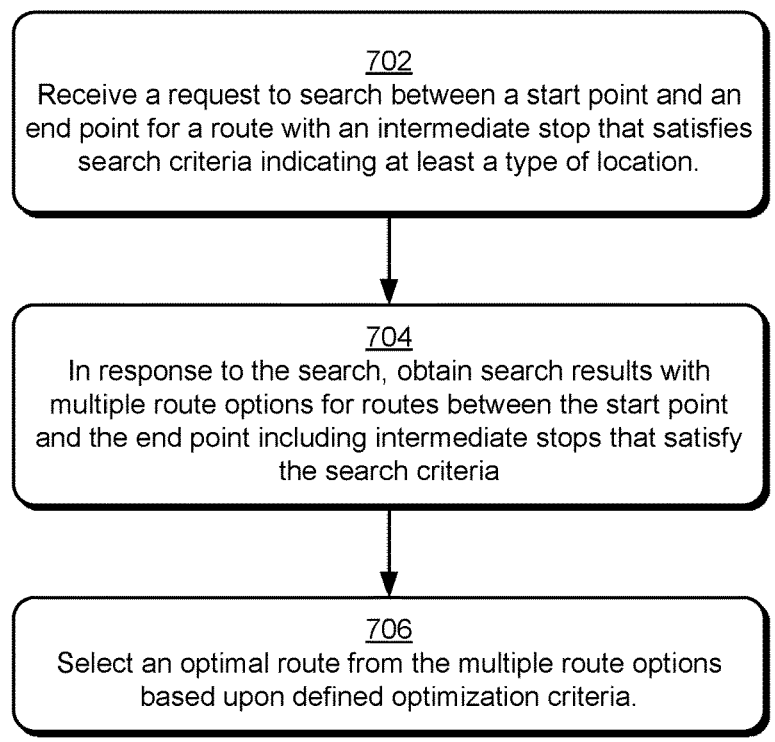
FIG. 7 is flow diagram depicting an example procedure for selecting an optimal route from multiple route options in accordance with one or more implementations.

FIG. 7 is flow diagram depicting an example procedure 700 for selecting an optimal route from multiple route options in accordance with one or more implementations. A request is received to search between a start point and an end point for a route with an intermediate stop that satisfies search criteria indicating at least a type of location (block 702). For example, a search may be defined via a user interface 111 for a map navigation tool 110 as discussed in relation to the example of FIG. 3. A search request may also be formed using voice commands and/or a digital assistant program. Generally, the request specifies at least a start and end point for user travel, and may also specify criteria for one or more intermediate stops to include in the route. Criteria may be input to specify a type or category of stop, generally or specifically. Examples of general categories include but are not limited to gas, food, park, pizza, entertainment, store, mall, beach, coffee shop etc. Examples of specific types of stops include but are not limited to Home Depot, Starbucks, Costco, etc.

In response to the search, search results are obtained with multiple route options for routes between the start point and end point including intermediate stops that satisfy the search criteria (block 704). For example, a map navigation tool 110 may operate to perform searches through interaction with the OS and/or service providers in the manner described in relation to FIG. 2 and elsewhere herein. The map navigation tool 110 also use and reference a map data store 204 to search POIs, map data, and other information that is maintained locally at a device. Thus, in some instances the search may involve a search of local resources. The multiple route options are calculated in dependence upon the search criteria indicating the type of location. Moreover, the multiple route options are calculated without constraining the calculation to a pre-established route between the start point and end point. In other words, the route is selected from the multiple route options as opposed to first setting a route from start to end and then considering and adding a stop along the set route.

An optimal route is selected from the multiple route options based upon defined optimization criteria. (block 706). The techniques discussed herein are applicable to situations in which a type or category based search is performed and search results with multiple matching options are returned. In this case, there may be multiple potential route options that satisfy the search constraints. Consequently, the map navigation tool 110 is configured to select an optimal route according to defined optimization criteria. Various criteria may be employed, examples of which are discussed throughout this document. Once an optimal route has been identified, the identified route may be employed in various ways. For example, a map view of the route may be exposed and navigation instructions to guide a user on the route may be initiated. Naturally, navigational guidance and instructions are configured to incorporate the specified stop for the route. Options for multiple different routes may also be exposed via a user interface to enable a user to select from among multiple presented options. In this case, a list or map view of the route options that is displayed may include different optimal routes corresponding to different criteria, an optimal route with one or more alternatives, a set of top raking options, and so forth. Navigational guidance and instructions and other actions are then initiated for a selected route responsive to a selection from the different options that are exposed.

Figure 8:
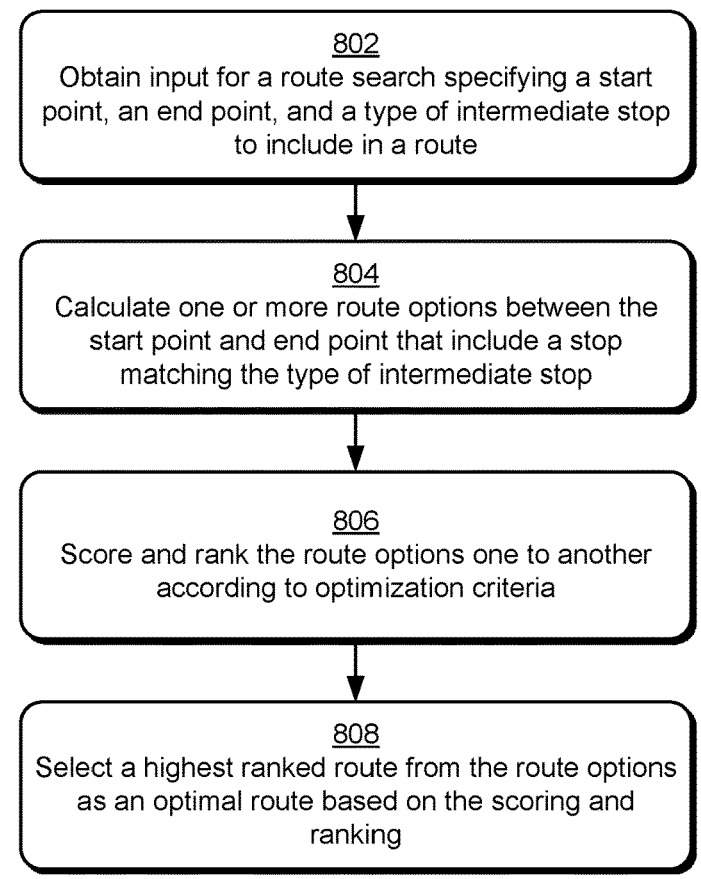
FIG. 8 is flow diagram depicting an example procedure for selecting an optimal route based on a specified type of stop between a start point and end point in accordance with one or more implementations.

FIG. 8 is flow diagram depicting an example procedure 800 for selecting an optimal route based on a specified type of stop between a start point and end point in accordance with one or more implementations. Input is obtained for a route search specifying a start point, an end point, and a type of intermediate stop to include in a route (block 802). Again, a search may be defined via a user interface 111 for a map navigation tool 110 in the manner described herein. As part of input to find a route, a user may supply a type or category of stop the user would like to include in the route. Based on the search constraints, one or more route options are calculated between the start point and end point that include a stop matching the type of intermediate stop (block 804) and the route options are scored and ranked one to another according to optimization criteria (block 806). Here, the map navigation tool 110 through an analytics module 206 or otherwise is operable to compute and assign scores to different route options based upon a set of optimization criteria, such as shortest distance, minimum travel time, etc. Scoring may occur using a weighted combination of multiple different factors included in the optimization criteria. In implementations, the weight may be configurable by a developer or a user to modify the contribution of different factors to the overall score and tune the system. The scores may be employed to compare and rank different options against each other. Then, a highest ranked route from the route options is selected as an optimal route based on the scoring and ranking (block 808). The selected route may be used in various ways. In one approach, the optimal route is shown via a user interface and a user is able confirm whether to keep or discard the route. In another approach, a list of the top scoring routes may be provided to enable a user selection from among a set of highest scoring options. Alternatively, the system may be configured to automatically pick the highest ranking route as a current route to follow and initiate route navigation and guidance for the current route without additional user input.

Figure 9:
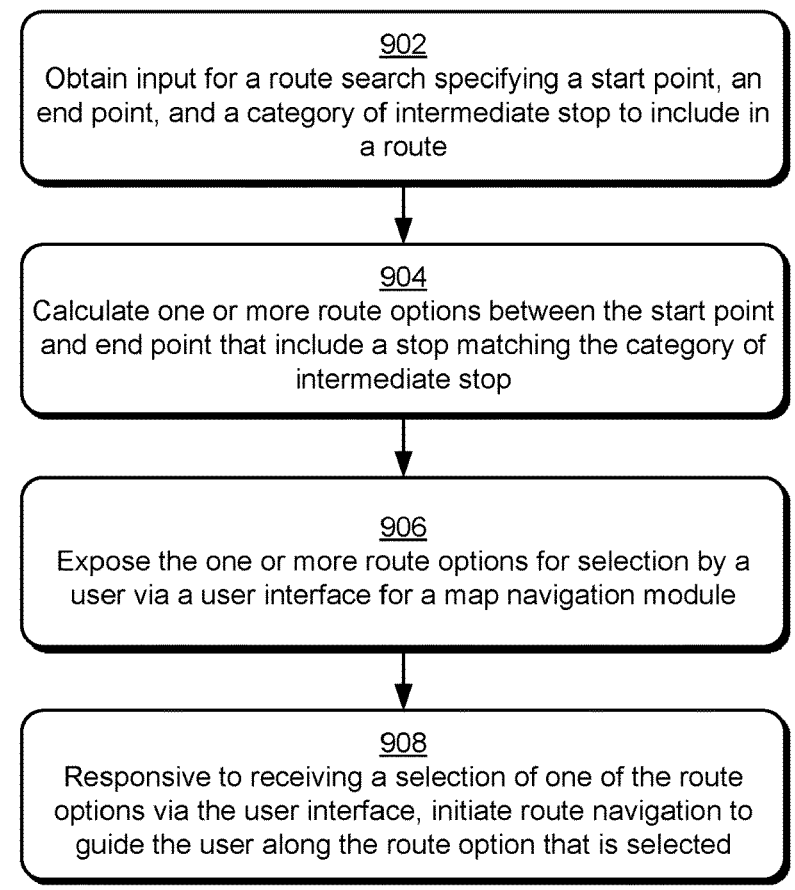
FIG. 9 is flow diagram depicting an example procedure for exposing route options calculated in dependence upon a specified intermediate stop for selection by a user in accordance with one or more implementations.

FIG. 9 is flow diagram depicting an example procedure 900 for exposing route options calculated in dependence upon a specified intermediate stop for selection by a user in accordance with one or more implementations. Input is obtained for a route search specifying a start point, an end point, and a category of intermediate stop to include in a route (block 902) and one or more route options are calculated between the start point and endpoint that include a stop matching the category of intermediate stop (block 904). Input of a search and determination of one or more route options including one or more specified stops may occur in various ways including the example procedures, components and scenarios discussed previously in relation to FIGS. 1-8. Once route options have been established, one or more route options are exposed for selection by a user via a user interface for a map navigation module (block 906). Here, an optimal route or a set of top ranking routes may be derived by scoring and ranking according to optimization criteria as previously discussed. The route options may be exposed by displaying at least one of a map view having visual indicators to show the available route options or a list view of the available route options. In implementation, the routes are provided as options selectable by a user to choose from among the routes. In deriving the route options, techniques to consider intermediate stops as part of the route determination as discussed herein are employed. Consequently, the routes are optimized and may be associated with ranks in accordance with particular optimization criteria used to compare routes that include different intermediate stops. Responsive to receiving a selection of one of the route options via the user interface, navigation is initiated to guide the user along the route option that is selected (block 908). In other words, route navigation and guidance for a selected route occurs via the map navigation tool 110 in response to user input to select a desired route. In this approach, the user is able to preview a set of ranked and ordered route options and make a decision regarding which route to take. The user may select an highest ranked item according to the specified optimization criteria or may select a different route based on their own preferences/criteria.

Having described example procedures and details in accordance with one or more implementations, consider now a discussion of example systems and devices that can be utilized to implement the various techniques described herein.

Example System and Device

Figure 10:
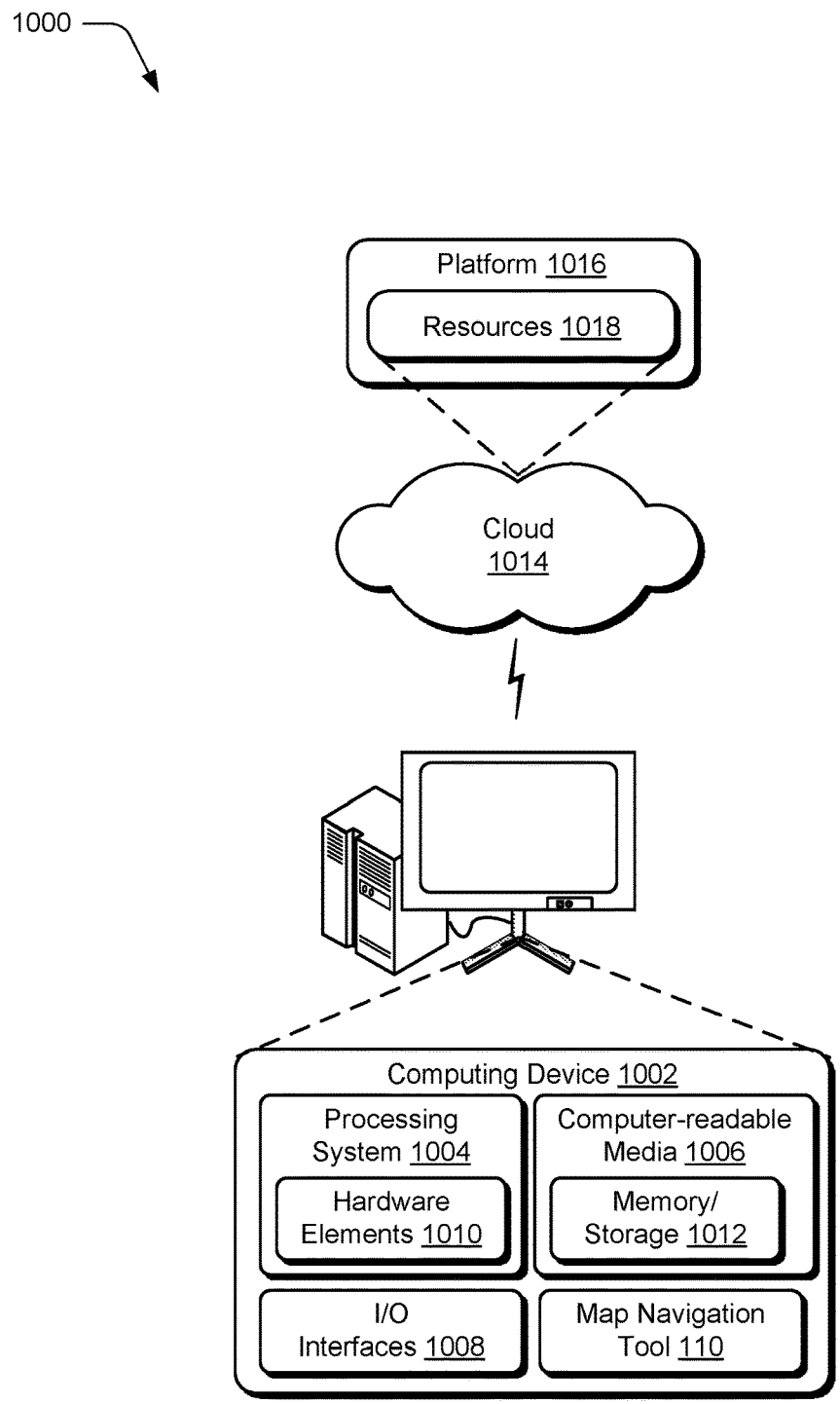
FIG. 10 illustrates an example system including various components of an example device that can be employed for one or more implementations of the techniques described herein.

FIG. 10 illustrates an example system generally at 1000 that includes an example computing device 1002 that is representative of one or more computing systems and/or devices that may implement the various techniques described herein. This is illustrated through inclusion of the map navigation tool 110, which operates as described above. The computing device 1002 may be, for example, a server of a service provider, a device associated with a client (e.g., a client device), an on-chip system, and/or any other suitable computing device or computing system.

The example computing device 1002 is illustrated as including a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" refers to media and/or devices that enable persistent storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

Example Implementations

Example implementations of techniques described herein include, but are not limited to, one or any combinations of one or more of the following examples:

Example 1

A method implemented by a computing device comprising: receiving a request to search between a start point and an end point for a route with an intermediate stop that satisfies search criteria indicating at least a type of location; responsive to the request, obtaining search results with multiple route options for routes between the start point and the end point including intermediate stops that satisfies the search criteria, the multiple route options being calculated in dependence upon the search criteria indicating the type of location and without constraining the calculation to a pre-established route between the start point and end point; and selecting an optimal route from the multiple route options based on defined optimization criteria.

Example 2

A method as recited in example 1, wherein the type of location is a location category.

Example 3

A method as recited in example 1, wherein the type of location is a specific name of a business or place with multiple distinct locations.

Example 4

A method as recited in example 1, further comprising exposing a representation of the optimal route in a map view presented via a user interface of a map navigation tool implemented by the computing device.

Example 5

A method as recited in example 1, wherein the optimization criteria include factors to account for one or more of: overall distance, travel time, traffic data, weather conditions, date and time, fuel economy, or distance and travel time to reach the intermediate stop.

Example 6

A method as recited in example 1, wherein selecting the optimal route includes ranking the route options one to another according to the optimization criteria, picking a highest ranking route from the route options as a current route, and initiating route navigation and guidance for the current route.

Example 7

A method as recited in example 1, wherein obtaining the search results comprises generating and providing a ranked and ordered list of route options that match the search criteria according to a search algorithm.

Example 8

A method as recited in example 1, wherein the request is received via route search functionality provided via user interface of a map navigation application that enables input of search parameters including designation of the start point, the end point, and the search criteria specifying one or more intermediate stops.

Example 9

A method as recited in example 1, further comprising rendering a view of the search results via a user interface for an application used to initiate the search, wherein the view includes at least one of: a map view depicting a representation of the multiple routes, or a list view providing a ranked and ordered list of the multiple routes to enable selection of a route by a user from available options.

Example 10

A method as recited in example 1, wherein obtaining search results comprises establishing a search area according to a configurable parameter that sets boundaries for the search and conducting a search for intermediate stops that satisfies the search criteria with the search area.

Example 11

A method implemented by a map navigation tool deployed on a computing device comprising: obtaining input for a route search specifying a start point, an end point, and a type of intermediate stop to include in a route; calculating one or more route options between the start point and end point that include a stop matching the type of intermediate stop without dependence upon a pre-established route; scoring and ranking the route options one to another according to optimization criteria; and selecting a highest ranked route from the route options as an optimal route based on the scoring and ranking.

Example 12

A method as recited in example 11, wherein selecting the highest ranked route comprises automatically picking the highest ranked route as a current route and initiating route navigation and guidance for the current route without additional user input.

Example 13

A method as recited in example 11, further comprising exposing the one or more route options that are calculated using visual indicators included in a map view presented via a user interface for the map navigation tool.

Example 14

A method as recited in example 13, wherein the visual indicators are selectable by a user to confirm a particular one of the one or more route options as a current route.

Example 15

A method as recited in example 11, wherein the optimization criteria include at least a factor for overall distance, such that the highest ranked route corresponds to a shortest overall distance.

Example 16

A method as recited in example 11, wherein the optimization criteria include at least a factor for overall travel time, such that the highest ranked route corresponds to a minimum overall travel time.

Example 17

A computing device comprising: a processing system; and one or more computer-readable storage media storing instructions that, when executed via the processing, implement a map navigation tool configured to perform operations to calculate optimal routes based on specified intermediate stops, the operations including: obtaining input for a route search specifying a start point, an end point, and a category of intermediate stop to include in a route; calculating one or more route options between the start point and end point that include a stop matching the category of intermediate stop without constraining the calculation to a pre-established route; exposing the one or more route options for selection by a user via a user interface for the map navigation tool; and responsive to receiving a selection of one of the route options via the user interface, initiating route navigation to guide the user along the route option that is selected.

Example 18

A computing device as recited in example 17, wherein exposing the one or more route options comprises displaying at least one of a map view having visual indicators to show the available route options or a list view of the available route options.

Example 19

A computing device as recited in example 17, wherein calculating the one or more route options comprises scoring and ranking multiple route options according to optimization criteria to derive a set of top ranking routes.

Example 20

A computing device as recited in example 17, wherein initiating route navigation comprises causing output of map views and navigational instructions via the map navigation tool to guide the user, including at least a view of the route option that is selected and directions to one or more intermediate stops included in the route option that is selected.

CONCLUSION

Although techniques have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter.

What is claimed is:
1. A method implemented by a computing device comprising:
   receiving a route search input comprising a start point, an end point, and an intermediate stop before a route is generated, the intermediate stop corresponding to search criteria indicating at least a type of location of the intermediate stop;

responsive to the route search input, generating multiple route options for routes between the start point and the end point, the multiple route options including a first route from the start point to the end point via the intermediate stop, the multiple route options further including a plurality of routes with intermediate stops that satisfy the search criteria indicating the type of location and without constraining the generating to a pre-established route between the start point and the end point; and selecting an optimal route from the multiple route options based on defined optimization criteria.

2. A method as recited in claim 1, wherein the type of location is a location category.

3. A method as recited in claim 1, wherein the intermediate stop search criteria indicates a type of the location for multiple intermediate stops.

4. A method as recited in claim 1, further comprising exposing a representation of the optimal route in a map view presented via a user interface of a map navigation tool implemented by the computing device.

5. A method as recited in claim 1, wherein the optimization criteria include factors to account for one or more of: overall distance, travel time, traffic data, weather conditions, date and time, fuel economy, or distance and travel time to reach the intermediate stop.

6. A method as recited in claim 1, wherein selecting the optimal route includes ranking the multiple route options according to the optimization criteria, selecting a highest ranking route from the multiple route options as a current route, and initiating route navigation and guidance for the current route.

7. A method as recited in claim 1, wherein generating the multiple route options includes providing a ranked and ordered list of the multiple route options that match the search criteria according to a search algorithm.

8. A method as recited in claim 1, wherein the route search input is received via route search functionality provided via user interface of a map navigation application that enables the route search input as search parameters including designation of the start point, the end point, and the intermediate stop corresponding to the search criteria specifying one or more of the intermediate stops.

9. A method as recited in claim 1, further comprising rendering a view of the multiple route options via a user interface for an application used to initiate the search, wherein the view includes at least one of: a map view depicting a representation of the multiple route options, or a list view providing a ranked and ordered list of the multiple route options.

10. A method as recited in claim 1, wherein generating the multiple route options comprises establishing a search area according to a configurable parameter that sets boundaries for the search in relation to the start point, the end point, and the intermediate stop, and conducting the search for the intermediate stops that satisfy the search criteria within the search area.

11. A method implemented by a map navigation tool deployed on a computing device comprising:

obtaining input for a route search specifying a start point, an end point, and an intermediate stop before a route from the start point to the intermediate stop to the end point is calculated, the intermediate stop corresponding to a type of intermediate stop to include in the route;

calculating one or more route options between the start point and the end point that include intermediate stops matching the type of intermediate stop without dependence upon a pre-established route, the one or more route options including the route;

scoring and ranking the one or more route options according to optimization criteria; and selecting a highest ranked route from the one or more route options as an optimal route based on the scoring and ranking.

12. A method as recited in claim 11, wherein selecting the highest ranked route comprises automatically selecting the highest ranked route as a current route and initiating route navigation and guidance for the current route without additional user input.

13. A method as recited in claim 11, further comprising exposing the calculated one or more route options using visual indicators included in a map view presented via a user interface for the map navigation tool.

14. A method as recited in claim 13, wherein the visual indicators are selectable by a user to confirm a particular one of the one or more route options as a current route.

15. A method as recited in claim 11, wherein the optimization criteria include at least a factor for overall distance, such that the highest ranked route corresponds to a shortest overall distance.

16. A method as recited in claim 11, wherein the optimization criteria include at least a factor for overall travel time, such that the highest ranked route corresponds to a minimum overall travel time.

17. A computing device comprising:

a processing system; and one or more computer-readable storage media storing instructions that, when executed via the processing system, implement a map navigation tool configured to perform operations to calculate optimal routes based on specified intermediate stops, the operations including:

obtaining input for a route search specifying a start point, an end point, and an intermediate stop before a route from the start point to the intermediate stop to the end point is calculated, the intermediate stop corresponding to a category of intermediate stop to include in the route;

calculating one or more route options between the start point and the end point that include intermediate stops matching the category of intermediate stop without constraining the calculation to a pre-established route, the one or more route options including the route;

exposing the one or more route options for selection by a user via a user interface for the map navigation tool; and responsive to receiving a selection of one of the route options via the user interface, initiating route navigation to guide the user along the route option that is selected.

18. A computing device as recited in claim 17, wherein exposing the one or more route options comprises displaying at least one of a map view having visual indicators to show available route options or a list view of the available route options.

19. A computing device as recited in claim 17, wherein calculating the one or more route options comprises scoring and ranking multiple route options according to optimization criteria to derive a set of top ranking routes.

20. A computing device as recited in claim 17, wherein initiating the route navigation comprises causing output of map views and navigational instructions via the map navigation tool to guide the user, including at least a view of the route option that is selected and directions to one or more intermediate stops included in the route option that is selected.

\* \* \* \* \*